(12) United States Patent
Bae et al.

(10) Patent No.: US 12,370,114 B2
(45) Date of Patent: Jul. 29, 2025

(54) STRENGTH ASSIST DEVICE

(71) Applicants: HYUNDAI MOTOR COMPANY, Seoul (KR); KIA CORPORATION, Seoul (KR)

(72) Inventors: Ki Hyeon Bae, Yongin-si (KR); Hyun Seop Lim, Anyang-si (KR); Sang In Park, Suwon-si (KR); Beom Su Kim, Yongin-si (KR); Ju Young Yoon, Suwon-si (KR); Kyu Jung Kim, Seoul (KR); Dong Jin Hyun, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 959 days.

(21) Appl. No.: 17/388,800

(22) Filed: Jul. 29, 2021

(65) Prior Publication Data

US 2022/0160570 A1     May 26, 2022

(30) Foreign Application Priority Data

Nov. 20, 2020     (KR) .................. 10-2020-0156982

(51) Int. Cl.
*A61H 1/02*     (2006.01)
(52) U.S. Cl.
CPC .............. *A61H 1/02* (2013.01); *A61H 1/0244* (2013.01); *A61H 2201/1253* (2013.01); *A61H 2201/149* (2013.01); *A61H 2201/1652* (2013.01)

(58) Field of Classification Search
CPC .......... A61H 1/00; A61H 1/02; A61H 1/0237; A61H 1/0244; A61H 2001/0248–0251;
(Continued)

(56) References Cited

U.S. PATENT DOCUMENTS 9,744,066 B2 *   8/2017   Kazerooni ............. A61H 3/008
10,195,100 B2    2/2019   Lee et al.
(Continued)

FOREIGN PATENT DOCUMENTS

JP     2016036726 A    3/2016
JP     2016041240 A    3/2016
(Continued)

OTHER PUBLICATIONS

Office Action cited in Japanese application No. 2021-148736; Apr. 9, 2025; 16 pp.
(Continued)

*Primary Examiner* — Rachel T Sippel
*Assistant Examiner* — Jacqueline M Pinderski
(74) *Attorney, Agent, or Firm* — Lempia Summerfield Katz LLC (57) ABSTRACT

A strength assist device includes: a base frame; a plurality of rotating bodies provided on left and right sides of the base frame, and rotatably connected to the base frame; a plurality of actuators rotatably connected to the respective rotating bodies, and forming respective restoring torques according to rotation angles with respect to the rotating bodies; and a cable connecting the rotating bodies. In particular, rotational motions of the rotating bodies with respect to the base frame are restricted against each other by a tension of the cable.

16 Claims, 10 Drawing Sheets

(58) Field of Classification Search
CPC ...... A61H 2201/1253; A61H 2201/149; A61H 2201/1652; A61H 1/0292; A61H 2201/1628; A61H 2201/164; A61H 2201/165; A61H 2201/1671; A61H 1/0262; A61H 1/0274; A61H 3/00; A61H 3/008; A61H 2003/007; A61H 2201/0192; A61H 2201/14; A61H 2201/1626; A61H 2201/163; A61H 2201/1642; B25J 9/00; B25J 9/0006; B25J 9/104
See application file for complete search history.

(56) References Cited

U.S. PATENT DOCUMENTS

| | | | |
|---|---|---|---|
| 10,201,447 | B2 | 2/2019 | Choi et al. |
| 10,328,300 | B2 | 6/2019 | Ko |
| 10,426,686 | B2 | 10/2019 | Se-gon et al. |
| 10,463,562 | B2 | 11/2019 | Chavarria et al. |
| 11,369,542 | B2 | 6/2022 | Lee et al. |
| 2013/0184626 | A1 | 7/2013 | Kazerooni et al. |
| 2014/0378882 | A1* | 12/2014 | Kazerooni ............... A61F 5/01 602/19 |
| 2015/0230964 | A1 | 8/2015 | Kazerooni et al. |
| 2016/0038328 | A1 | 2/2016 | Choi et al. |
| 2016/0045387 | A1 | 2/2016 | Lee et al. |
| 2016/0250062 | A1 | 9/2016 | Radaelli et al. |
| 2017/0100626 | A1* | 4/2017 | Ko ....................... A63B 21/154 |
| 2017/0119613 | A1 | 5/2017 | Roh et al. |
| 2018/0049905 | A1 | 2/2018 | Holscher et al. |
| 2018/0147108 | A1 | 5/2018 | Lee et al. |
| 2018/0193172 | A1* | 7/2018 | Smith ....................... A61F 2/70 |
| 2018/0338883 | A1 | 11/2018 | Chavarria et al. |
| 2019/0009405 | A1* | 1/2019 | Ko ......................... B25J 9/0006 |
| 2019/0358074 | A1 | 11/2019 | Zelik et al. |

FOREIGN PATENT DOCUMENTS

| | | |
|---|---|---|
| JP | 2020146761 A | 9/2020 |
| JP | 2020151791 A | 9/2020 |
| KR | 20120082219 A | 7/2012 |
| KR | 10-2017-0043116 | 4/2017 |
| KR | 20170052374 A | 5/2017 |
| KR | 20180060853 A | 6/2018 |
| KR | 20190089118 A | 7/2019 |

OTHER PUBLICATIONS

Office Action cited in Korean application No. 10-2020-0156982; May 30, 2025; 16 pp.

* cited by examiner

STRENGTH ASSIST DEVICE

CROSS-REFERENCE TO RELATED APPLICATION

This application claims priority to and the benefit of Korean Patent Application No. 10-2020-0156932, filed on Nov. 20, 2020, the entire contents of which are incorporated herein by reference.

FIELD

The present disclosure relates to a strength assist device, and more particularly, to a strength assist device designed to assist users' (pedestrians' or operators') activities or tasks.

BACKGROUND

The statements in this section merely provide background information related to the present disclosure and may not constitute prior art.

A strength assist device designed to support a user's activities or tasks may reduce a load applied to part of the user's body such as the waist during the activities or tasks by generating a torque by elasticity in the vicinity of a rotatable joint such as the hip joint.

Such a strength assist device is usually provided with structures generating torque, which are formed on both left and right sides thereof, respectively. The strength assist device may be divided into: i) a device in which the two structures are connected to each other so that the two structures may move in an interlocking manner; and ii) a device in which the two structures are provided independently of each other so that the two structures may move independently.

However, we have discovered that the size of the strength assist device cannot be adjusted according to the user's body size and shape, and that the two structures generating torque in the strength assist device operate independently such that the user feels uncomfortable when the user wearing the strength assist device is walking.

SUMMARY

An aspect of the present disclosure provides a strength assist device capable of adjusting its size by taking a user's body type into consideration, and significantly reducing an uncomfortable feeling that may occur in a walking process or the like.

According to an aspect of the present disclosure, a strength assist device may include: a base frame; a first rotating body provided on a left side of the base frame, and rotatably connected to the base frame; a second rotating body provided on a right side of the base frame, and rotatably connected to the base frame; a first actuator rotatably connected to one side of the first rotating body, and forming a first restoring torque according to a rotation angle with respect to the first rotating body; a second actuator rotatably connected to one side of the second rotating body, and forming a second restoring torque according to a rotation angle with respect to the second rotating body; and a cable connecting the first rotating body to the second rotating body, wherein a rotational motion of the first rotating body with respect to the base frame and a rotational motion of the second rotating body with respect to the base frame may be restricted against each other by a tension of the cable.

The base frame may include: a first frame to which the first rotating body is rotatably connected; and a second frame to which the second rotating body is rotatably connected. The first frame and the second frame may be movable relative to each other.

The cable may surround at least a portion of an outer circumference of the first rotating body and at least a portion of an outer circumference of the second rotating body.

When the first actuator and the second actuator rotate with respect to the base frame in the same direction, the first actuator may rotate with respect to the first rotating body so that the first restoring torque may be formed, and the second actuator may rotate with respect to the second rotating body so that the second restoring torque may be formed.

When the first actuator and the second actuator rotate with respect to the base frame in opposite directions, the first actuator may be fixed to the first rotating body so that the first restoring torque may not be formed, and the second actuator may be fixed to the second rotating body so that the second restoring torque may not be formed.

The actuator may include: an actuator body part forming a body of the actuator; and a plate rotatably connected to the actuator body part, and fixedly connected to the rotating body.

The rotating body may include: a rotating body part forming a body of the rotating body; and a locking portion protruding from the rotating body part.

The plate may include a recessed portion which is recessed inwardly from an outer peripheral edge of the plate, and the locking portion may be engaged with the recessed portion.

The rotating body may further include a latch portion engaged with the locking portion, and the latch portion may move the locking portion to allow the locking portion to be engaged with the recessed portion or be disengaged from the recessed portion.

When the locking portion is engaged with the recessed portion, the plate may be fixedly connected to the rotating body.

The restoring torque may be formed when the actuator body part rotates with respect to the rotating body and the plate in a state in which the plate is fixedly connected to the rotating body.

The actuator may further include a linkage structure provided inside the actuator body part and including a plurality of links and a plurality of elastic bodies, and the restoring torque may be formed by a position change between the links and the elastic bodies which is made when the actuator body part rotates with respect to the plate.

When the locking portion is disengaged from the recessed portion, the plate may be rotatable with respect to the rotating body and be fixed to the actuator body part.

The base frame may further include a third frame between the first frame and the second frame, each of the first frame and the second frame may include a horizontal guide hole which is a through hole formed in the first frame and the second frame and extending in a horizontal direction, the third frame may include a fixing portion inserted into the horizontal guide hole, and the fixing portion may move along the horizontal guide hole in the horizontal direction so that a gap between the first frame and the second frame may be adjusted.

The cable may be a bowden cable.

The first frame may include a first pulley, the second frame may include a second pulley, the third frame may include a third pulley, and the third pulley may move vertically with respect to the first pulley and the second pulley.

The third frame may further include a vertical guide hole which is a through hole formed in the third frame and extending in a vertical direction, and the third pulley may be inserted into the vertical guide hole.

The cable may be provided between the first pulley and the third pulley, and the cable may be provided between the second pulley and the third pulley.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, the structure and operation principle of a strength assist device according to exemplary forms of the present disclosure will be described in detail with reference to the accompanying drawings.

Figure 1:
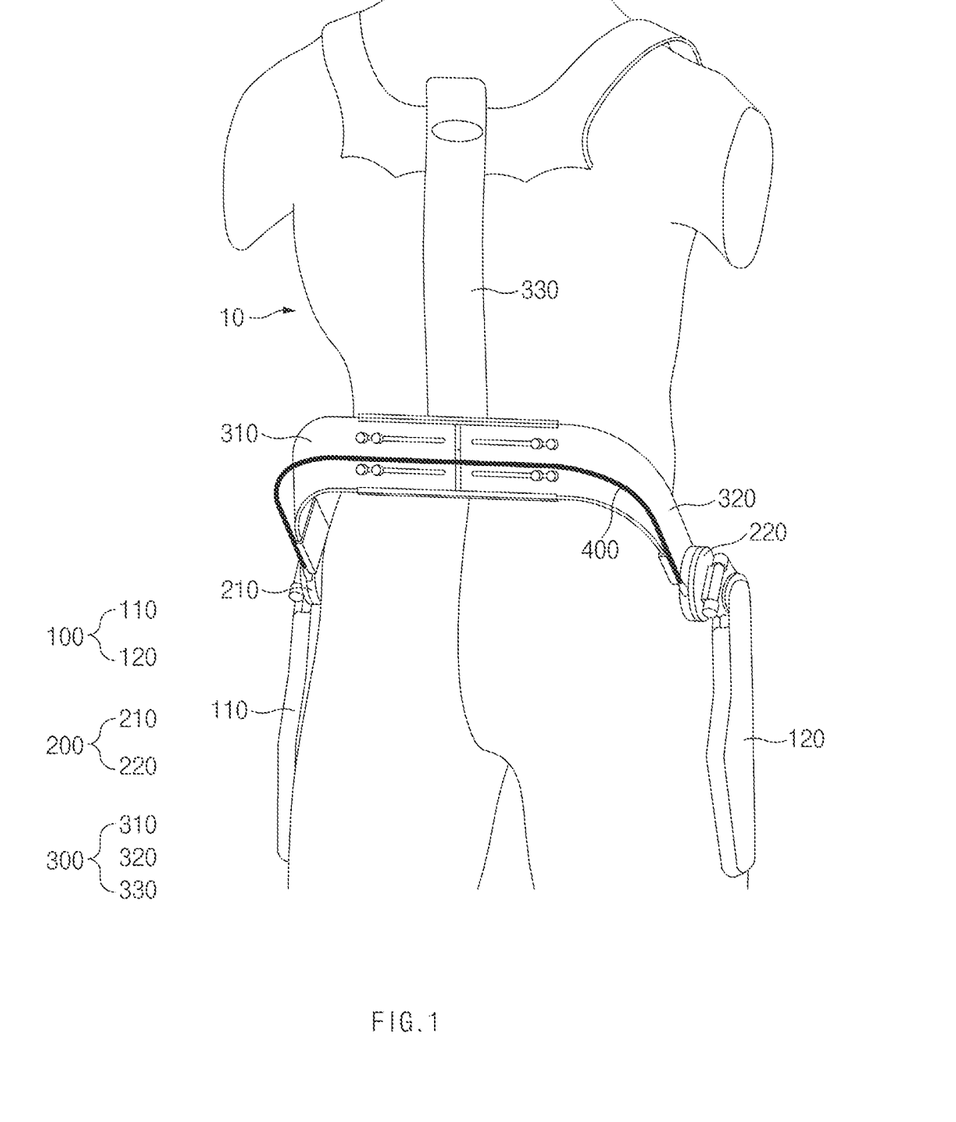
FIG. 1 illustrates a perspective view of a strength assist device according to an exemplary form of the present disclosure, which is worn by a user.
Figure 2:
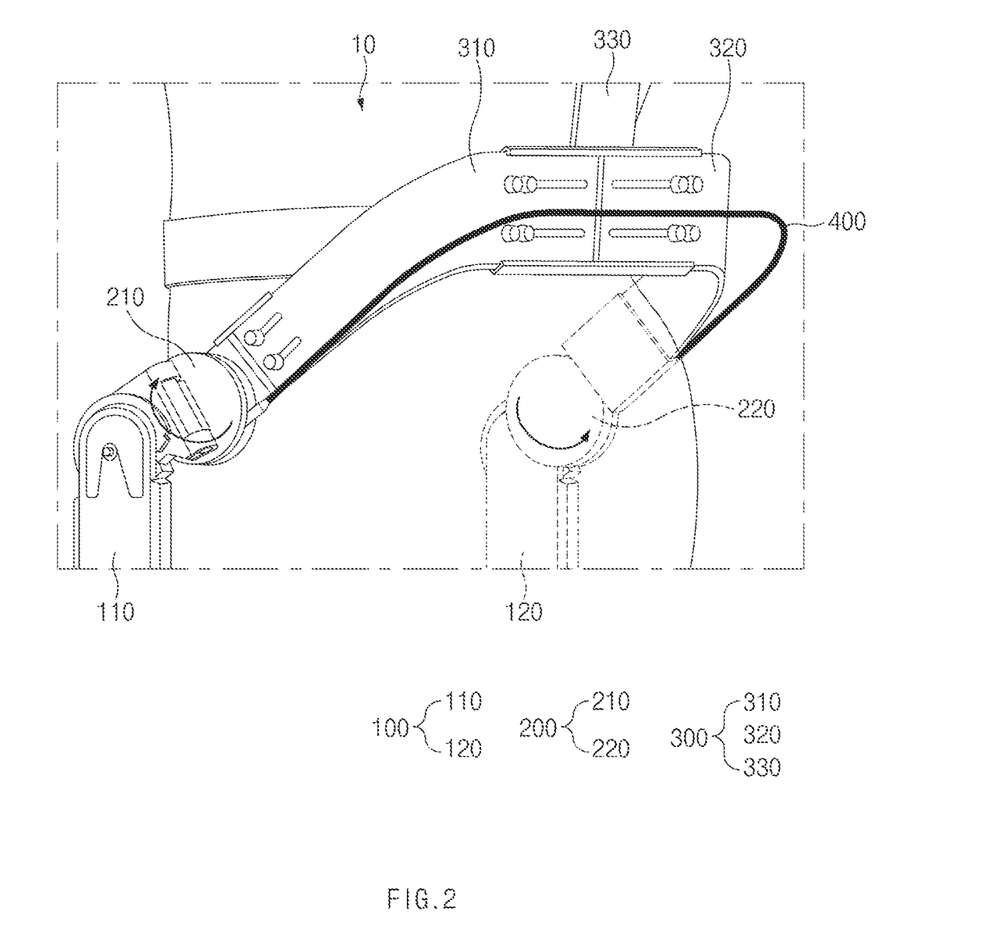
FIG. 2 illustrates an enlarged perspective view of the strength assist device illustrated in FIG. 1.
Figure 3:
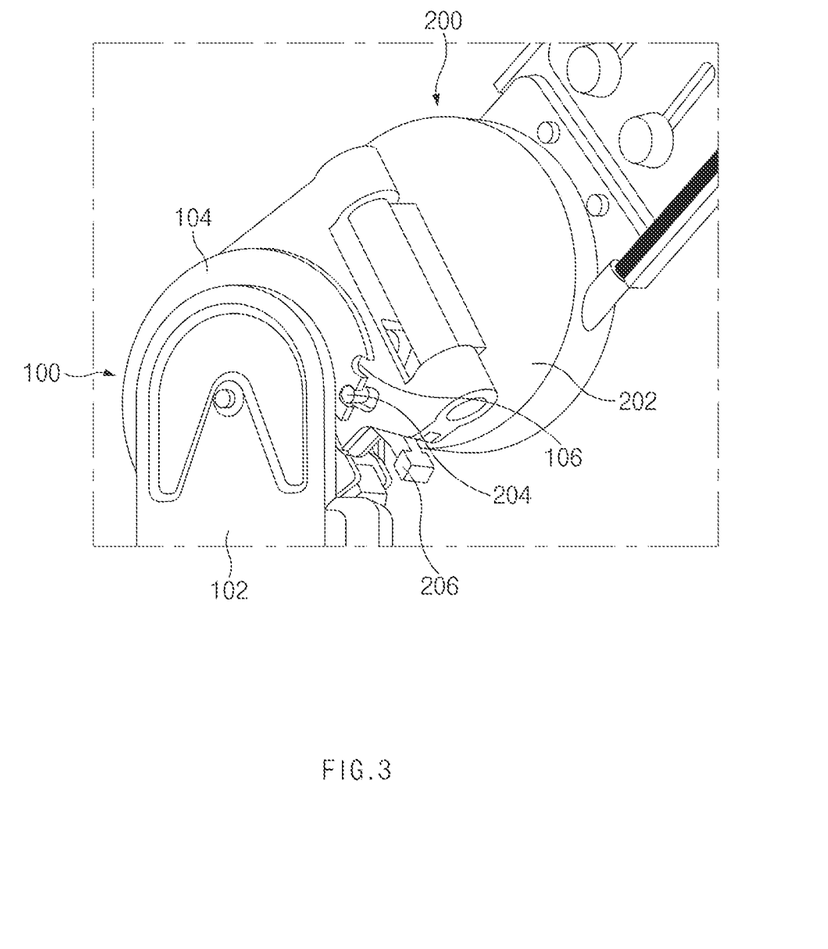
FIG. 3 illustrates an enlarged perspective view of an actuator and a rotating body in a strength assist device according to an exemplary form of the present disclosure.

FIG. 1 illustrates a perspective view of a strength assist device according to an exemplary form of the present disclosure, which is worn by a user, and FIG. 2 illustrates an enlarged perspective view of the strength assist device illustrated in FIG. 1. In addition, FIG. 3 illustrates an enlarged perspective view of an actuator and a rotating body in a strength assist device according to an exemplary form of the present disclosure.

As illustrated in FIG. 1, a strength assist device 10 may include a base frame 300. The base frame 300 may form a body of the strength assist device 10, and may surround a part of a user's body so that the strength assist device 10 may be worn by the user. As illustrated in FIGS. 1 and 2, the base frame 300 may surround the user's waist. In addition, the strength assist device 10 may reduce a load applied to the user's waist.

The base frame 300 may be an assembly of a plurality or components. For example, as illustrated in FIGS. 1 and 2, the base frame 300 may include a first frame 310 provided on the left side and a second frame 320 provided on the right side. Here, the first frame 310 and the second frame 320 may be able to move relative to each other. In one form, when the user wears the strength assist device 10, the first frame 310 and the second frame 320 may move relative to each other in a horizontal direction. Thus, by moving the first frame 310 and the second frame 320 according to the user's body type, a transverse length of the strength assist device 10 may be adjusted.

Meanwhile, the strength assist device 10 according to an exemplary form of the present disclosure may further include a rotating body 200 provided on a side of the base frame 300 and rotatably connected to the base frame 300. More specifically, the rotating body 200 may include a first rotating body 210 provided on the left side of the base frame 300 and rotatably connected to the base frame 300, and a second rotating body 220 provided on the right side of the base frame 300 and rotatably connected to the base frame 300. In one form, the first rotating body 210 may be connected to the left side of the first frame 310 and rotatably connected to the first frame 310, and the second rotating body 220 may be connected to the right side of the second frame 320 and rotatably connected to the second frame 320.

In addition, the strength assist device 10 according to an exemplary form of the present disclosure may further include an actuator 100 rotatably connected to one side of the rotating body 200. The actuator 100 may form a restoring torque according to a rotation angle of the actuator 100 with respect to the rotating body 200. Thus, the restoring torque formed by the actuator 100 may help reduce a load applied to the user.

Figure 4:
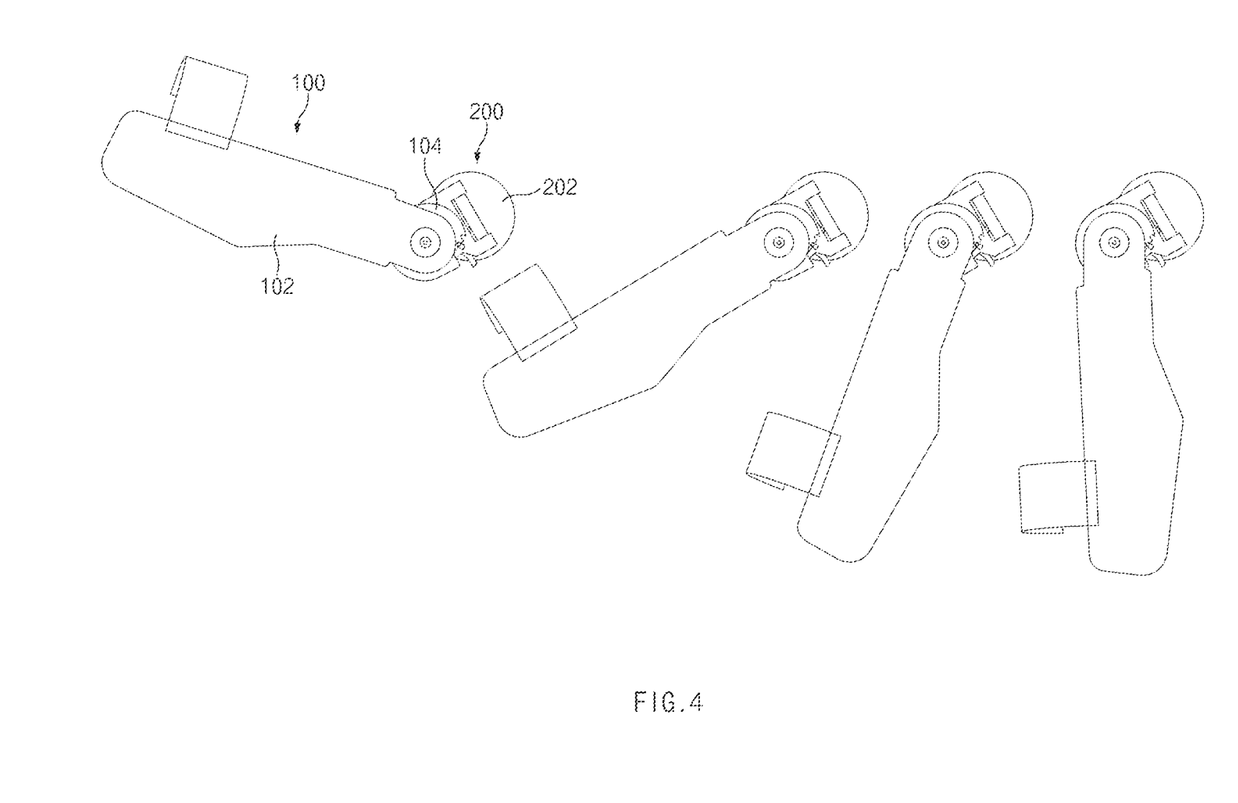
FIG. 4 illustrates various side views of the rotation of an actuator with respect to a rotating body in a strength assist device according to an exemplary form of the present disclosure.

FIG. 4 illustrates various side views of the rotation of an actuator with respect to a rotating body in a strength assist device according to an exemplary form of the present disclosure.

Referring to FIG. 4, the rightmost reference view illustrates a state in which a restoring torque is not formed as the actuator 100 does not rotate with respect to the rotating body 200, and the other views illustrate a state in which a restoring torque is formed as the actuator 100 rotates with respect to the rotating body 200. In particular, a rotation angle at which the actuator 100 rotates with respect to the rotating body 200 is illustrated as gradually increasing in the views provided to the left of the reference view in FIG. 4. As the rotation angle increases, the restoring torque may increase. In FIG. 4, when the actuator 100 rotates with respect to the rotating body 200 in a clockwise direction, the restoring torque generated by the actuator 100 may be formed in a counterclockwise direction.

Referring to FIGS. 1 and 2, the actuator 100 may include a first actuator 110 rotatably connected to one side of the first rotating body 210 and forming a first restoring torque according to a rotation angle with respect to the first rotating body 210, and a second actuator 120 rotatably connected to one side of the second rotating body 220 and forming a second restoring torque according to a rotation angle with respect to the second rotating body 220. FIGS. 1 and 2 illustrate the first actuator 110 provided on the left side of the first rotating body 210 and the second actuator 120 provided on the right side of the second rotating body 220.

Referring to FIGS. 1 and 2, the strength assist device 10 according to an exemplary form of the present disclosure may further include a cable 400 connecting the first rotating body 210 to the second rotating body 220. As illustrated in FIG. 2, the cable 400 may surround at least a portion of an outer circumference of the first rotating body 210 and at least a portion of an outer circumference of the second rotating body 220.

The cable 400 may restrict a rotational motion of the first rotating body 210 with respect, to the base frame 300 and a rotational motion of the second rotating body 220 with respect to the base frame 300. More specifically, the rotational motion of the first rotating body 210 with respect to the base frame 300 and the rotational motion of the second rotating body 220 with respect to the base frame 300 may be restricted against each other by a tension of the cable 400. According to an exemplary form of the present disclosure, when the first rotating body 210 rotates with respect to the base frame 300 in one direction, the second rotating body 220 may rotate with respect to the base frame 300 in the opposite direction due to the tension of the cable 400. For example, as indicated by arrows illustrated in FIG. 2, when the first rotating body 210 rotates with respect to the base frame 300 in a clockwise direction, the cable 400 may move in a direction of winding the first rotating body 210. In this case, due to the tension of the cable 400, the cable 400 may move in a direction of being unwound from the second rotating body 220, and accordingly the second rotating body 220 may rotate in a counterclockwise direction. Thus, the rotation directions of the first rotating body 210 and the second rotating body 220 may be opposite to each other by the tension of the cable 400.

More specifically, according to an exemplary form of the present disclosure, when the rotation direction of the first actuator 110 and the rotation direction of the second actuator 120 with respect to the base frame 300 are opposite to each other by the tension of the cable 400, the first actuator 110 may be fixed to the first rotating body 210 so that the aforementioned first restoring torque may not be formed, and the second actuator 120 may be fixed to the second rotating body 220 so that the aforementioned second restoring torque may not be formed.

In one form, when the first actuator 110 and the second actuator 120 rotate with respect to the base frame 300 in the opposite directions, the first rotating body 210 may rotate together with the first actuator 110 with respect to the base frame 300, and the second rotating body 220 may rotate together with the second actuator 120 with respect to the base frame 300. In this case, as first actuator 110 does not rotate with respect to the first rotating body 210, the first restoring torque may not be formed, and as the second actuator 120 does not rotate with respect to the second rotating body 220, the second restoring torque may not be formed.

This may be applied to a case in which the user wearing the strength assist device 10 is walking. For example, the following case may be considered: the user wears the strength assist device 10 in a manner that allows the base frame 300 to surround the user's waist, mounts the first actuator 110 on the user's left leg with the first rotating body 210 located on the user's left hip joint, and mounts the second actuator 120 on the user's right leg with the second rotating body 220 located on the user's right hip joint. For example, in the walking process of the user, when the user's left leg is positioned forward, the user's right leg may be positioned backward, and accordingly, the first actuator 110 may rotate forward, and the second actuator 120 may rotate backward.

However, when the user is simply walking, the user does not need to be assisted by the restoring torque generated by the strength assist device 10, so the first restoring torque and the second restoring torque of the first actuator 110 and the second actuator 120 are not required. According to an exemplary form of the present disclosure, in the user's walking process, the strength assist device 10 may allow the first rotating body 210 and the second rotating body 220 to rotate in the opposite directions by the tension of the cable 400, thereby allowing the first rotating body 210 and the second rotating body 220 to be fixed to the first actuator 110 and the second actuator 120, respectively. Thus, the aforementioned restoring torque may not be generated when the user is simply walking.

On the other hand, according to an exemplary form of the present disclosure, when the rotation direction of the first actuator 110 and the rotation direction of the second actuator 120 with respect to the base frame 300 are the same as each other, the first actuator 110 may rotate with respect to the first rotating body 210 so that the first restoring torque may be formed, and the second actuator 120 may rotate with respect to the second rotating body 220 so that the second restoring torque may be formed.

In another form, when the first actuator 110 and the second actuator 120 rotate with respect to the base frame 300 in the same direction, the first actuator 110 may rotate with respect to the first rotating body 210 while the first rotating body 210 is fixed to the base frame 300, and the second actuator 120 may rotate with respect to the second rotating body 220 while the second rotating body 220 is fixed to the base frame 300.

This may be applied to a case in which the user wearing the strength assist device 10 is performing a task. For example, when the user wearing the strength assist device 10 bends the waist to lift an object, the user's waist may rotate with respect to the user's legs. Accordingly, a relative rotational motion may occur between the actuators 110 and 120 mounted on the user's legs and the base frame 300.

Here, the rotating bodies 210 and 220 connected to the actuators 110 and 120 try to rotate in a direction in which the actuators 110 and 120 rotate with respect to the base frame 300. However, since the first rotating body 210 and the second rotating body 220 try to rotate in the same direction, the tension of the cable 400 may increase, and accordingly, the first rotating body 210 and the second rotating body 220 may fail to rotate with respect to the base frame 300, but may be fixed to the base frame 300. Thus, a rotation angle may be formed between the first rotating body 210 and the first actuator 110 and between the second rotating body 220 and the second actuator 120. As a result, the first restoring torque and the second restoring torque may be formed by the first actuator 110 and the second actuator 120, respectively, and a load applied to the user's waist may be significantly reduced due to the first and second restoring torques.

Meanwhile, referring to FIG. 3, the actuator 100 may include an actuator body part 102 forming a body of the actuator 100, and a plate 104 rotatably connected to the actuator body part 102 and fixedly connected to the rotating body 200.

In addition, the rotating body 200 may include a rotating body part 202 forming a body of the rotating body 200, and a locking portion 204 protruding from the rotating body part 202 in one direction.

As described above, the plate 104 may be fixedly connected to the rotating body 200. However, according to an exemplary form of the present disclosure, the plate 104 and the rotating body 200 may also be released (disengaged) from each other according to the user's intention.

Figure 5:
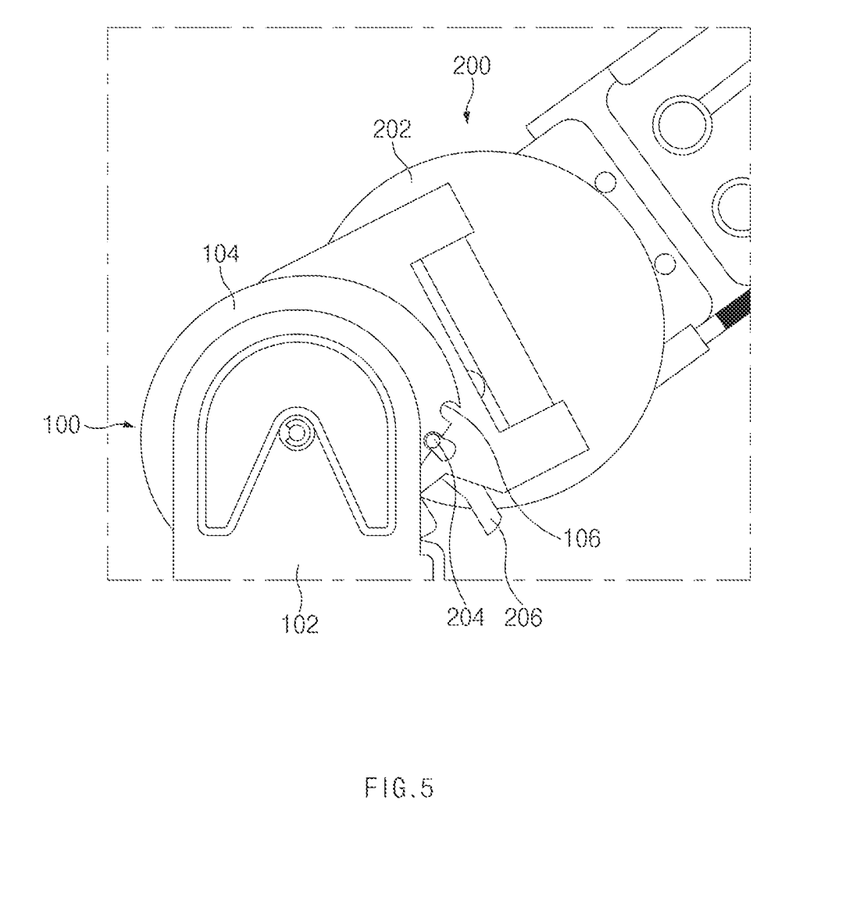
FIG. 5 illustrates the engagement of a plate of an actuator and a rotating body in a strength assist device according to an exemplary form of the present disclosure.
Figure 6:
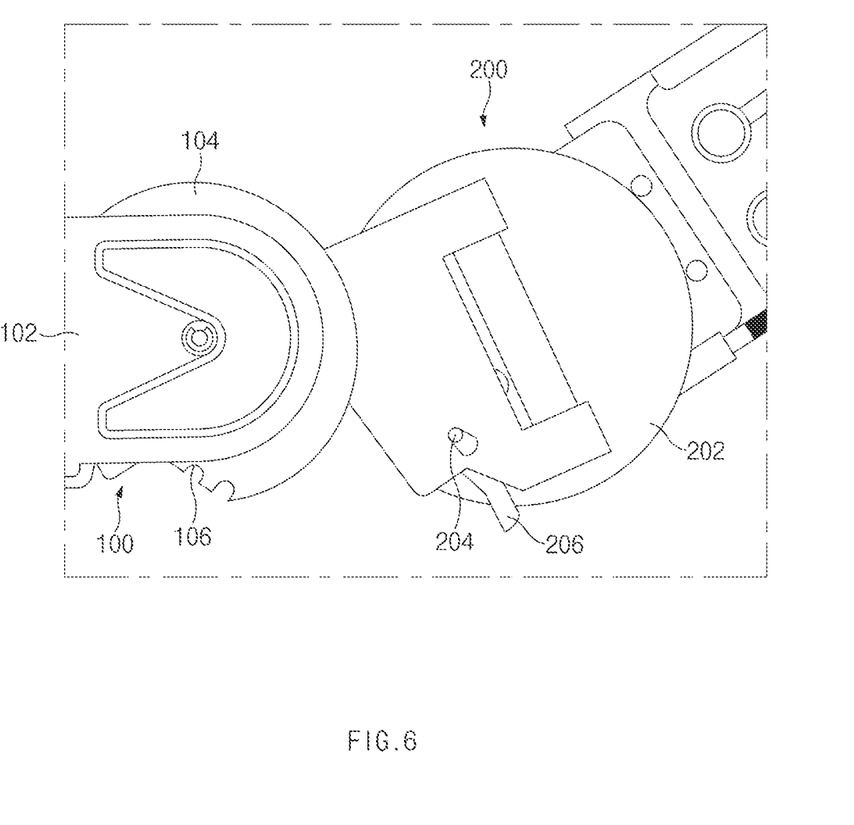
FIG. 6 illustrates the disengagement of a plate of an actuator and a rotating body in a strength assist device according to an exemplary form of the present disclosure.

More specifically, as illustrated in FIG. 3, the plate 104 may include a recessed portion 106 which is recessed inwardly from an outer peripheral edge of the plate 104. The locking portion 204 may be engaged with the recessed portion 106. When the locking portion 204 is engaged with the recessed portion 106, the plate 104 may be fixedly connected to the rotating body 200, and when the locking portion 204 is disengaged from the recessed portion 106, the plate 104 and the rotating body 200 may be released from each other. Meanwhile, FIGS. 5 and 6 illustrate the plate 104 having two recessed portions 106. In this case, the locking portion 204 may be selectively engaged with any one of the two recessed portions 106.

FIG. 5 illustrates the engagement of a plate of an actuator and a rotating body in a strength assist device according to an exemplary form of the present disclosure, and FIG. 6 illustrates the disengagement of a plate of an actuator and a rotating body in a strength assist device according to an exemplary form of the present disclosure.

Referring to FIGS. 5 and 6, the rotating body 200 may further include a latch portion 206 engaged with the locking portion 204 and being movable. According to an exemplary form of the present disclosure, the latch portion 206 may move the locking portion 204 to allow the locking portion 204 to be engaged with the recessed portion 106 or be disengaged from the recessed portion 106. In particular, as illustrated in FIG. 5, when the locking portion 204 is engaged with the recessed portion 106, the plate 104 may be fixedly connected to the rotating body 200 as described above.

In particular, the aforementioned restoring torque may be formed when the actuator body part 102 rotates with respect to the rotating body 200 and the plate 104 in a state in which the plate 104 is fixedly connected to the rotating body 200. More specifically, the actuator 100 may further include a linkage structure (not shown) provided inside the actuator body part 102 and including a plurality of links and a plurality of elastic bodies. Here, the aforementioned restoring torque may be formed by a position change between the links and the elastic bodies which is made when the actuator body part 102 rotates with respect to the plate 104.

Meanwhile, as illustrated in FIG. 6, when the latch portion 206 moves the locking portion 204 and the locking portion 204 is disengaged from the recessed portion 106, the plate 104 may freely rotate with respect to the rotating body 200 and may be fixed to the actuator body part 102. The following case may be exemplified: when the locking portion 204 is disengaged from the recessed portion 106, the user wearing the strength assist device 10 is sitting on a chair to relax. In this case, since the restoring torque is not required, the locking portion 204 may be disengaged from the recessed portion 106 so that a rotational motion between the plate 104 and the actuator body part 102 may not occur.

Figure 7:
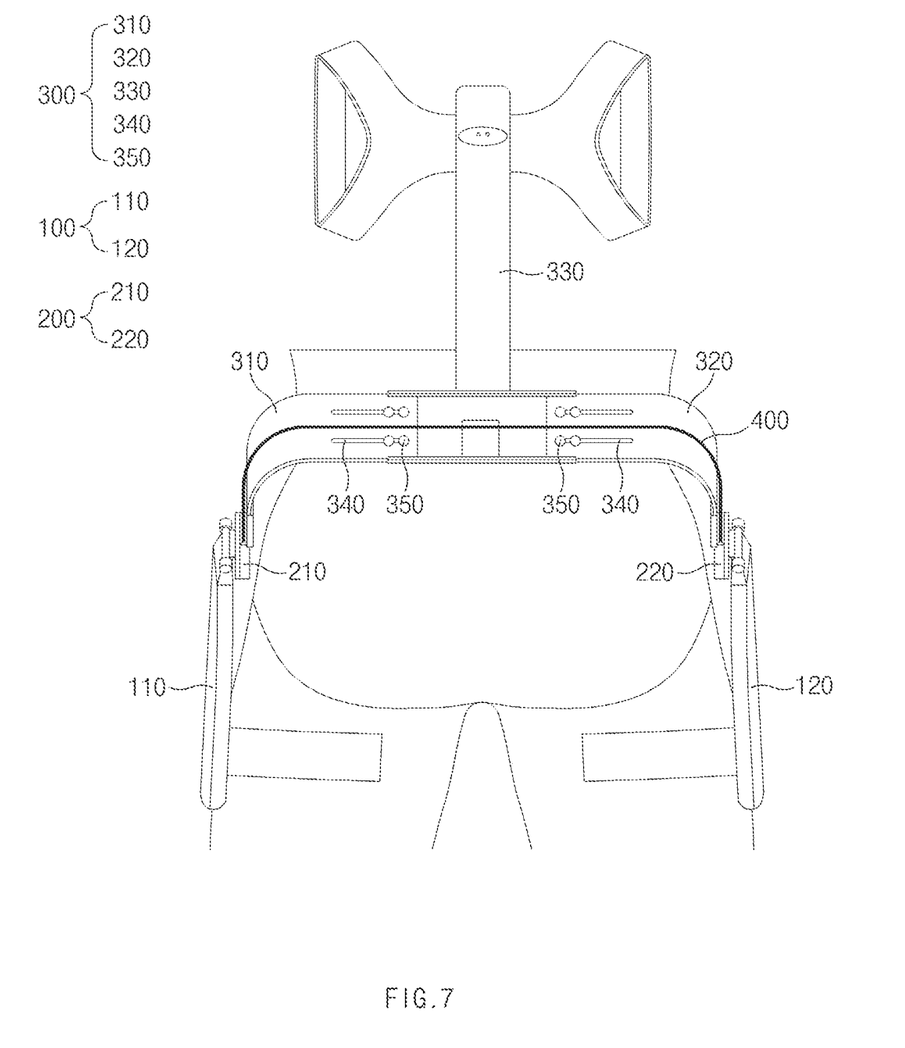
FIG. 7 illustrates a strength assist device according to an exemplary form of the present disclosure, which is worn by a user in a state in which a transverse length of the strength assist device is increased.
Figure 8:
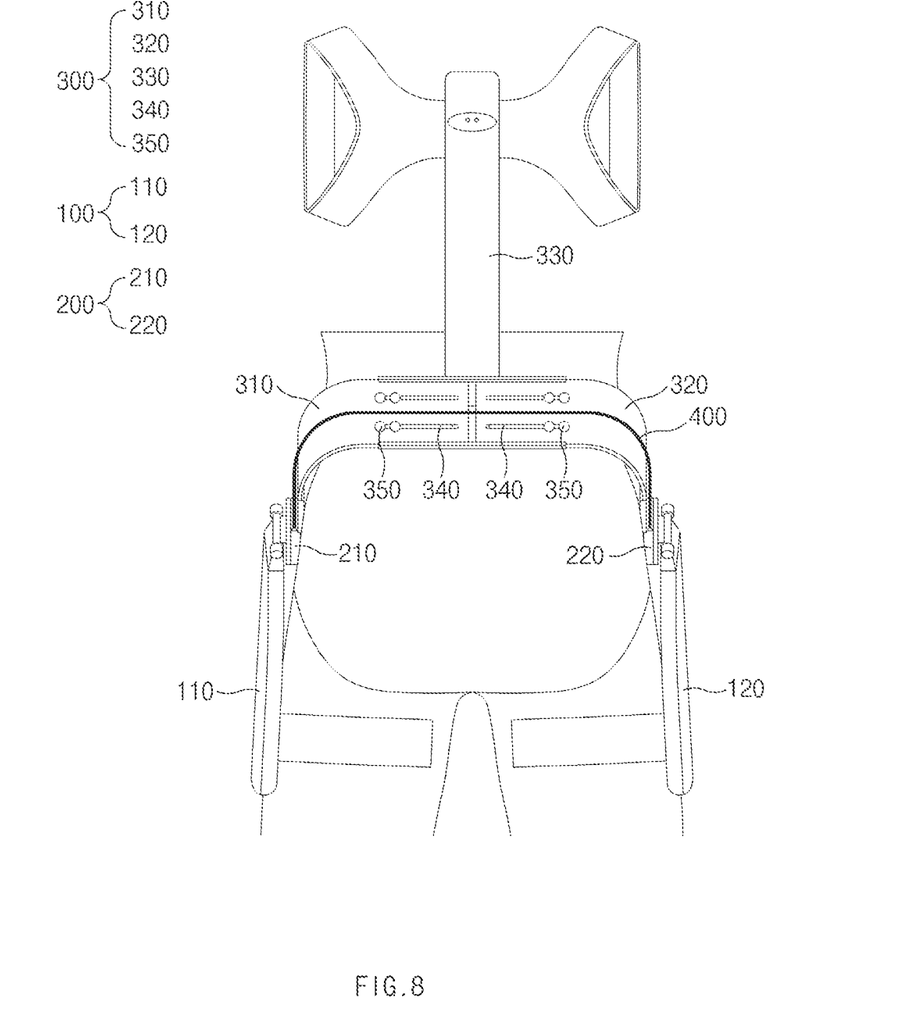
FIG. 8 illustrates a strength assist device according to an exemplary form of the present disclosure, which is worn by a user in a state in which a transverse length of the strength assist device is reduced.

FIG. 7 illustrates a strength assist device according to an exemplary form of the present disclosure, which is worn by a user in a state in which a transverse length of the strength assist device is increased, and FIG. 8 illustrates a strength assist device according to an exemplary form of the present disclosure, which is worn by a user in a state in which a transverse length of the strength assist device is reduced.

Referring to FIGS. 7 and 8, the base frame 300 may further include a third frame 330 between the first frame 310 and the second frame 320.

Here, each of the first frame 310 and the second frame 320 may include a horizontal guide hole 340 which is a through hole formed in the first frame 310 and the second frame 320 and extending in a horizontal direction, and the third frame 330 may include a fixing portion 350 inserted into the horizontal guide hole 340.

The fixing portion 350 may move along the horizontal guide hole 340 in the horizontal direction, so that a gap between the first frame 310 and the second frame 320 may be adjusted. According to an exemplary form of the present disclosure, by adjusting a horizontal position of the fixing portion 350 in the horizontal guide hole 340, the transverse length of the strength assist device 10 may be adjusted. For example, when a user with a large body type wears the strength assist device 10, the fixing portion 350 may be positioned in or be adjacent to an inner end portion of the horizontal guide hole 340 so that the transverse length of the strength assist device 10 may be increased as illustrated in FIG. 7. When a user with a small body type wears the strength assist device 10, the fixing portion 350 may be positioned in or be adjacent to an outer end portion of the horizontal guide hole 340 so that the transverse length of the strength assist device 10 may be reduced as illustrated in FIG. 8.

Meanwhile, according to an exemplary form of the present disclosure, the cable 400 may be a bowden cable. The bowden cable may be a flexible type cable used to transmit force or energy, and may include a cable housing and an inner cable provided inside the cable housing. The bowden cable may transmit the force or energy by the relative motion of the inner cable with respect to the cable housing. Details of the bowden cable can be understood based on the prior art, and various types of bowden cable structures known in the prior art may be applied to the cable 400.

Figure 9:
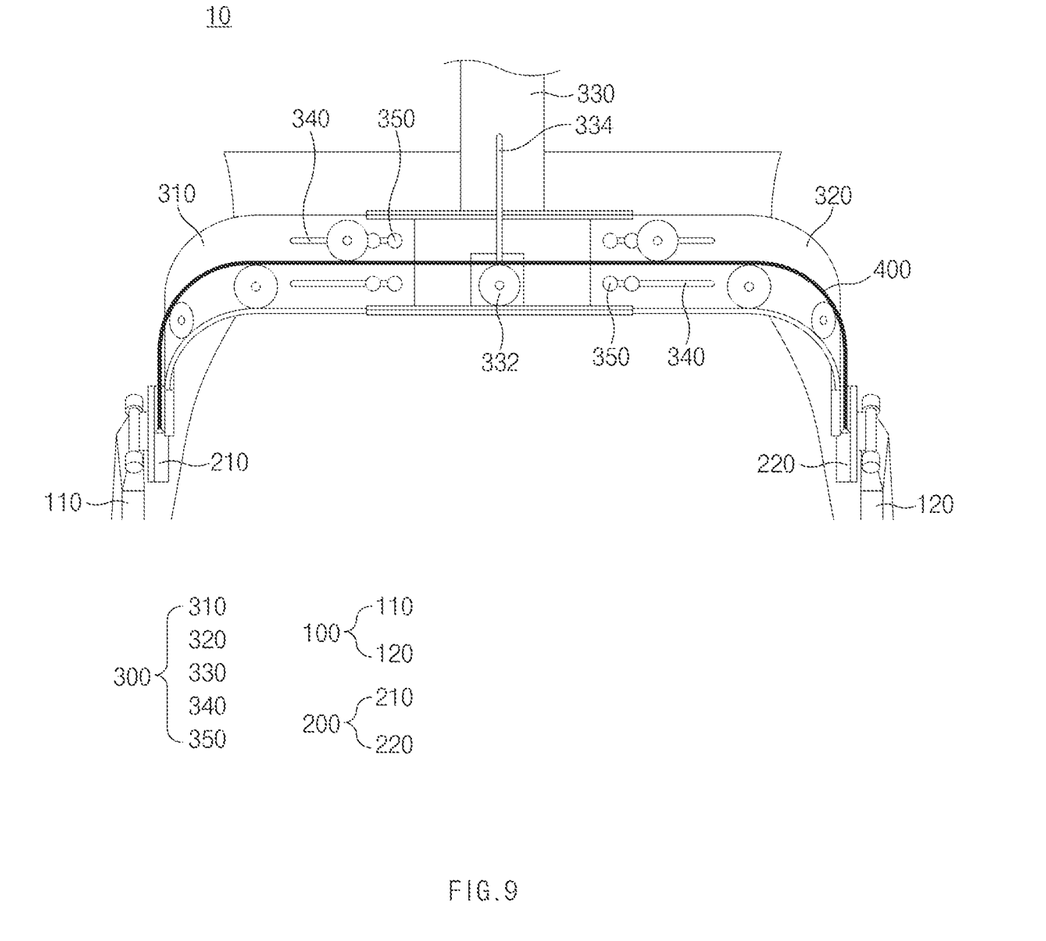
FIG. 9 illustrates a strength assist device according to another exemplary form of the present disclosure, which is worn by a user in a state in which a transverse length of the strength assist device is increased.
Figure 10:
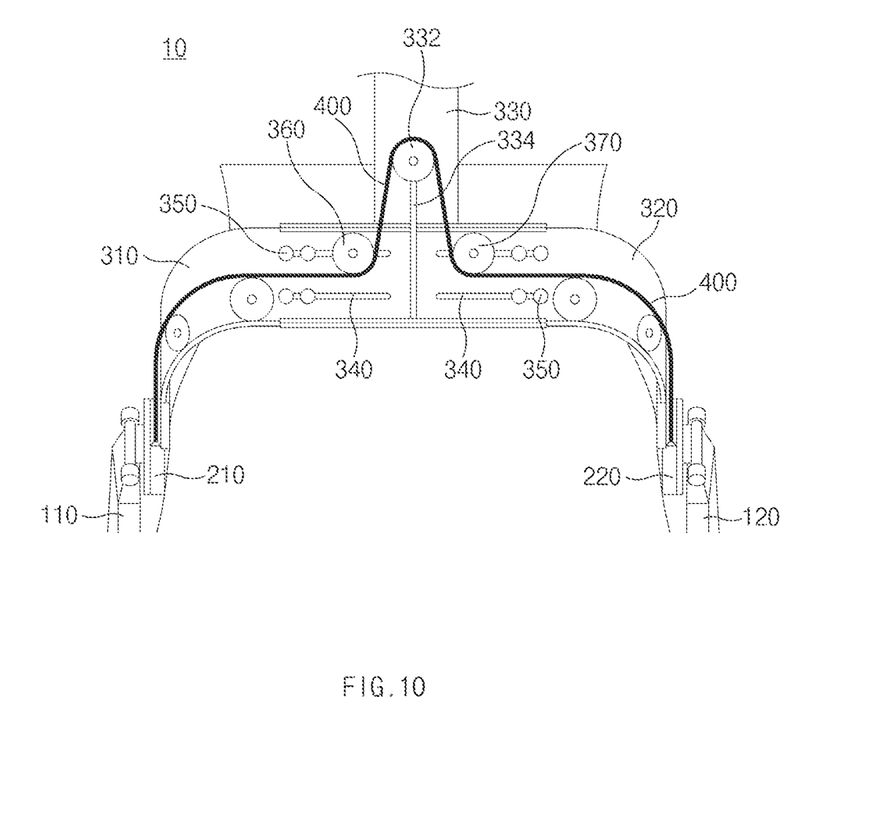
FIG. 10 illustrates a strength assist device according to another exemplary form of the present disclosure, which is worn by a user in a state in which a transverse length of the strength assist device is reduced.

FIG. 9 illustrates a strength assist device according to another exemplary form of the present disclosure, which is worn by a user in a state in which a transverse length of the strength assist device is increased, and FIG. 10 illustrates a strength assist device according to another exemplary form of the present disclosure, which is worn by a user in a state in which a transverse length of the strength assist device is reduced. Hereinafter, a strength assist device 10 according to another exemplary form of the present disclosure will be described by focusing on differences in comparison with the strength assist device 10 according to the previous exemplary form. Unless otherwise defined, the above-described features of the strength assist device in the previous exemplary form may be equally applied to the following exemplary form of the present disclosure.

According to another exemplary form of the present disclosure, the first frame 310 may include a first pulley 360, the second frame 320 may include a second pulley 370, and the third frame 330 may include a third pulley 332. The third pulley 332 may move vertically with respect to the first pulley 360 and the second pulley 370.

More specifically, the third frame 330 may further include a vertical guide hole 334 which is a through hole formed in the third frame 330 and extending in a vertical direction. Here, the third pulley 332 may be inserted into the vertical guide hole 334. Thus, the third pulley 332 may move vertically along the vertical guide hole 334.

Meanwhile, as illustrated in FIGS. 9 and 10, the cable 400 may be provided between the first pulley 360 and the third pulley 332, and be provided between the second pulley 370 and the third pulley 332.

According to another exemplary form of the present disclosure, when a user with a small body type wears the strength assist device 10, it may be desired to reduce the transverse length of the strength assist device 10 as illustrated in FIG. 10. In this case, however, the tension of the cable 400 may be reduced, and accordingly, the restriction between the first rotating body 210 and the second rotating body 220 by the cable 400 may not be achieved properly.

According to another exemplary form of the present disclosure, the third pulley 332 may move upwardly so that the tension of the cable 400 may be maintained even if the transverse length of the strength assist device 10 is reduced. In this case, a portion of the cable 400 between the first pulley 360 and the third pulley 332 and a portion of the cable 400 between the second pulley 370 and the third pulley 332 may move upwardly by the third pulley 332. When a user with a large body type wears the strength assist device 10, the third pulley 332 may move downwardly as illustrated in FIG. 9 so that the tension of the cable 400 may be maintained.

As set forth above, the strength assist device according to exemplary forms of the present disclosure may adjust its size by taking the user's body type into consideration, and significantly reduce an uncomfortable feeling that may occur in the walking process or the like.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A strength assist device, comprising:
   a base frame;
   a first rotating body provided on a left side of the base frame and rotatably connected to the base frame;
   a second rotating body provided on a right side of the base frame and rotatably connected to the base frame;
   a first actuator rotatably connected to one side of the first rotating body and configured to provide a first restoring torque based on a rotation angle with respect to the first rotating body;
   a second actuator rotatably connected to one side of the second rotating body and configured to provide a second restoring torque based on a rotation angle with respect to the second rotating body; and
   a cable connecting the first rotating body to the second rotating body,
   wherein a rotational motion of the first rotating body with respect to the base frame and a rotational motion of the second rotating body with respect to the base frame are restricted against each other by a tension of the cable,
   wherein the first and second actuators each include:
     an actuator body part; and
     a plate rotatably connected to the actuator body part,
   wherein the plate of the first actuator is fixedly connected to the first rotating body, and the plate of the second actuator is fixedly connected to the second rotating body, and
   wherein the first and second rotating bodies each include:
     a rotating body part; and
     a locking portion protruding from the rotating body part.

2. The strength assist device according to claim 1, wherein the base frame includes:
   a first frame to which the first rotating body is rotatably connected; and
   a second frame to which the second rotating body is rotatably connected, wherein the first frame and the second frame are movable relative to each other.

3. The strength assist device according to claim 2, wherein:
   the base frame further includes a third frame between the first frame and the second frame,
   each of the first frame and the second frame includes a horizontal guide hole which is a through hole formed in the first frame and the second frame and extending in a horizontal direction,
   the third frame includes a fixing portion inserted into the horizontal guide hole, and
   the fixing portion is configured to move along the horizontal guide hole in the horizontal direction such that a gap between the first frame and the second frame is adjusted.

4. The strength assist device according to claim 1, wherein the cable is configured to surround at least a portion of an outer circumference of the first rotating body and at least a portion of an outer circumference of the second rotating body.

5. The strength assist device according to claim 4, wherein when the first actuator and the second actuator rotate with respect to the base frame in the same direction, the first actuator is configured to rotate with respect to the first rotating body and form the first restoring torque, and the second actuator is configured to rotate with respect to the second rotating body and form the second restoring torque.

6. The strength assist device according to claim 4, wherein when the first actuator and the second actuator rotate with respect to the base frame in opposite directions, the first actuator is fixed to the first rotating body such that the first restoring torque is not formed, and the second actuator is fixed to the second rotating body such that the second restoring torque is not formed.

7. The strength assist device according to claim 1, wherein the plates of the first and second actuators each include a recessed portion which is recessed inwardly from an outer peripheral edge of the plate, and
   the locking portion is engaged with the recessed portion.

8. The strength assist device according to claim 7, wherein:
   the first and second rotating bodies further each include a latch portion engaged with the locking portion, and
   the latch portion is configured to move the locking portion to allow the locking portion to be engaged with the recessed portion or be disengaged from the recessed portion.

9. The strength assist device according to claim 8, wherein when the locking portion is engaged with the recessed portion, the plates of the first and second actuators are fixedly connected to the first rotating body and the second rotating body, respectively.

10. The strength assist device according to claim 9, wherein the restoring torque is respectively formed when the actuator body parts of the first and second actuators respectively rotate with respect to the first and second rotating bodies and the plates of the first and second actuators are fixedly connected to the first and second rotating bodies, respectively.

11. The strength assist device according to claim 10, wherein:
the first and second actuators further each includes a linkage structure provided inside the actuator body part,
the linkage structure includes a plurality of links and a plurality of elastic bodies, and
the restoring torque is formed by a position change between the plurality of links and the plurality of elastic bodies as the actuator body parts of the first and second actuators respectively rotate with respect to the plates of the first and second actuators.

12. The strength assist device according to claim 8, wherein when the locking portion is disengaged from the recessed portion, a corresponding plate among the plates of the first and second actuators is rotatable with respect to a corresponding rotating body among the first and second rotating bodies and fixed to a corresponding actuator body part among the actuator body parts of the first and second actuators.

13. The strength assist device according to claim 1, wherein the cable is a Bowden cable.

14. The strength assist device according to claim 1, wherein the base frame includes:
a first frame to which the first rotating body is rotatably connected; and
a second frame to which the second rotating body is rotatably connected, wherein
the first frame and the second frame are movable relative to each other, wherein:
the base frame further includes a third frame between the first frame and the second frame,
each of the first frame and the second frame includes a horizontal guide hole which is a through hole formed in the first frame and the second frame and extending in a horizontal direction,
the third frame includes a fixing portion inserted into the horizontal guide hole, and
the fixing portion is configured to move along the horizontal guide hole in the horizontal direction such that a gap between the first frame and the second frame is adjusted, and
wherein:
the first frame includes a first pulley,
the second frame includes a second pulley,
the third frame includes a third pulley, and
the third pulley is configured to move vertically with respect to the first pulley and the second pulley.

15. The strength assist device according to claim 14, wherein the third frame further includes a vertical guide hole which is a through hole formed in the third frame and extending in a vertical direction, and
the third pulley is inserted into the vertical guide hole.

16. The strength assist device according to claim 15, wherein:
the cable is provided between the first pulley and the third pulley, and
the cable is provided between the second pulley and the third pulley.

* * * * *